(12) United States Patent
Peng et al.

(10) Patent No.: US 7,697,278 B2
(45) Date of Patent: Apr. 13, 2010

(54) FIXING APPARATUS FOR HARD DISK DRIVE

(75) Inventors: Wen-Tang Peng, Taipei Hsien (TW); Guang-Yi Zhang, Shenzhen (CN); Zhe Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 97 days.

(21) Appl. No.: 11/963,867

(22) Filed: Dec. 24, 2007

(65) Prior Publication Data
US 2009/0097196 A1    Apr. 16, 2009

(30) Foreign Application Priority Data
Oct. 11, 2007    (CN) .................. 2007 1 0202016

(51) Int. Cl.
*G06F 1/16*    (2006.01)
(52) U.S. Cl. .............................. 361/679.35; 364/708.1; 439/639; 248/633
(58) Field of Classification Search .............. 364/708.1; 439/638, 639; 248/618, 633; 361/679.3, 361/679.26, 679.27, 679.35
See application file for complete search history.

(56) References Cited

U.S. PATENT DOCUMENTS

| | | | | |
|---|---|---|---|---|
| 2007/0035920 | A1* | 2/2007 | Peng et al. | 361/685 |
| 2007/0211422 | A1* | 9/2007 | Liu et al. | 361/685 |
| 2008/0259554 | A1* | 10/2008 | Qin et al. | 361/685 |
| 2009/0073649 | A1* | 3/2009 | Ikeda et al. | 361/679.35 |

* cited by examiner

*Primary Examiner*—Hung V Duong
(74) *Attorney, Agent, or Firm*—Frank R. Niranjan

(57) ABSTRACT

An exemplary fixing apparatus is for mounting a hard disk drive (HDD) having a plurality of holes defined in sidewalls and includes a bracket, a pair of shock absorbing members, and a plurality of fixing pins. The bracket includes an end plate, and a pair of side plates extending from two ends of the end plate. The side plates include a pair of latches extending therefrom and detachably locking with each other. The shock absorbing members are attached to insides of the side plates. The fixing pins are attached to the shock absorbing members and engage in the holes of the HDD.

18 Claims, 3 Drawing Sheets

FIXING APPARATUS FOR HARD DISK DRIVE

CROSS-REFERENCES TO RELATED APPLICATION

Relevant subject matter is disclosed in the 6 co-pending U.S. patent application Ser. Nos. 11/963,871, 11/963,869, 11/963,868, 11/963,864, 11/963,865, 11/963,870; filed on the same date and having a same title as the present application, which are assigned to the same assignee as this patent application. Relevant subject matter is also disclosed in the co-pending U.S. patent application Ser. No. 11/953,863, filed on Dec. 11, 2007, having a same title as the present application, which is assigned to the same assignee as this patent application.

BACKGROUND

1. Field of the Invention

The present invention relates to fixing apparatuses, and particularly to a fixing apparatus for hard disk drives (HDDs).

2. Description of Related Art

The conventional approach now being adopted to mount an HDD in a computer chassis generally involves placing the HDD in a holding area of a drive bracket; screwing a plurality of screws through side walls of the drive bracket into two sides of the HDD to fasten the HDD on the drive bracket; and mounting the HDD and the bracket in a computer chassis or a mobile HDD rack. For proper balanced installation of the HDD, multiple screws should be fastened at the same time, making installing and removing operations of the HDD tedious.

What is desired, therefore, is a fixing apparatus which allows convenient installation and removal of an HDD.

SUMMARY

An exemplary fixing apparatus is for mounting a hard disk drive (HDD) having a plurality of holes defined in sidewalls and includes a bracket, a pair of shock absorbing members, and a plurality of fixing pins. The bracket includes an end plate, and a pair of side plates extending from opposite ends of the end plate respectively. The side plates include a pair of latches extending therefrom and detachably locking with each other. The shock absorbing members are attached to insides of the side plates. The fixing pins are attached to the shock absorbing members and engage in the holes of the HDD.

Other advantages and novel features will become more apparent from the following detailed description when taken in conjunction with the accompanying drawings, in which:

DETAILED DESCRIPTION OF THE EMBODIMENT

Figure 1:
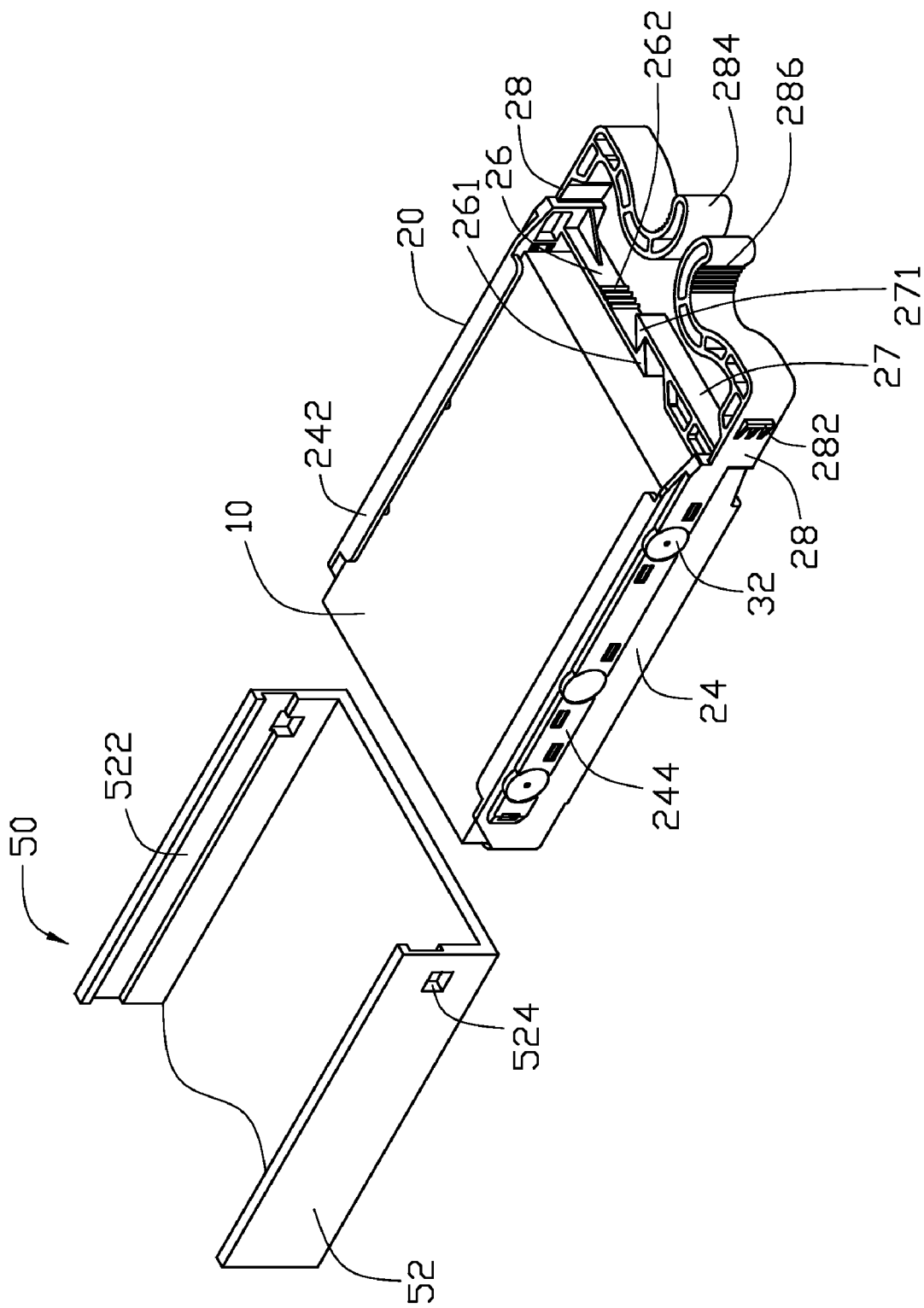
FIG. 1 is an isometric view of a fixing apparatus of an embodiment of the present invention assembled with an HDD, and a rack.
Figure 2:
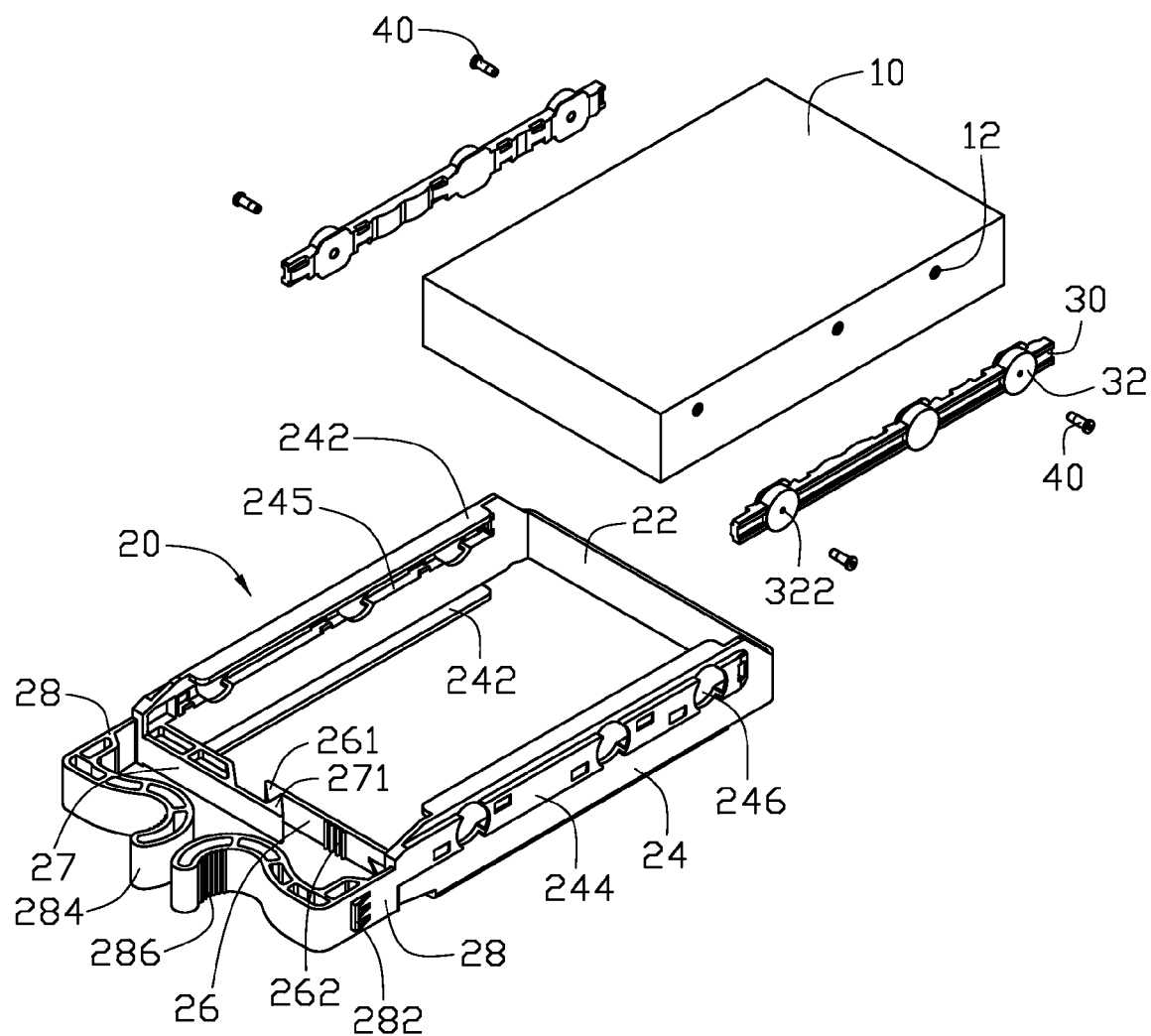
FIG. 2 is an exploded, isometric view of the fixing apparatus of FIG. 1.

Referring to FIGS. 1 and 2, a fixing apparatus in accordance with an embodiment of the present invention is for fixing a hard disk drive (HDD) 10 and mounting the HDD 10 in a rack 50. The fixing apparatus includes a bracket 20, a pair of shock absorbing members 30, and a plurality of fixing pins 40.

The rack 50 includes a pair of parallel sidewalls 52 defining a receiving space therebetween. A pair of railways 522 is defined at the insides of the sidewalls 52, respectively. A pair of locking holes 524 is defined in the sidewalls 52 beside the railways 522, respectively.

The HDD 10 includes a pair of holes 12 defined in each of two opposite sidewalls thereof.

The bracket 20 has a U-shaped integral configuration and includes an end plate 22, and a pair of side plates 24 extending perpendicularly from opposite ends of the end plate 22 respectively in a same direction. One side plate 24 includes a latch 26 extending toward the other one of the side plates 24 with a hook 261 formed at the distal end thereof facing outward in relation to the HDD 10 once installed. The other one of the side plates 24 has a latch 27 extending toward the one of the side plates 24 with an inward facing hook 271 formed at the distal end thereof for latching with the hook 261 of the latch 26. In this embodiment, a toothed urging portion 262 is formed at an outside wall of the latch 26. A pair of locking portions 28 extends forward from the front ends of the side plates 24 respectively. A pair of wedged blocks 282 extends outward from outside walls of the locking portions 28, respectively. A pair of J-shaped operating arms 284 extends toward each other from distal ends of the locking portions 28 respectively. A toothed urging portion 286 is formed at the inside of the arced free end of each of the operating arms 284. Each of the side plates 24 includes a pair of flanges 242 extending perpendicularly from an upper edge and a lower edge thereof, respectively. Each of the side plates 24 includes a long platform 244 extruding from an outside wall thereof, and a recessed portion 245 correspondingly defined in an inside wall thereof. A plurality of mounting holes 246 is defined in the platforms 244, extending to the side plates 24.

Each of the shock absorbing members 30 is an elongated bar and made of conductive rubber. A plurality of cylindrical mounting portions 32 is formed in each of the shock absorbing members 30. A central through hole 322 is defined in each of the mounting portions 32.

Figure 3:
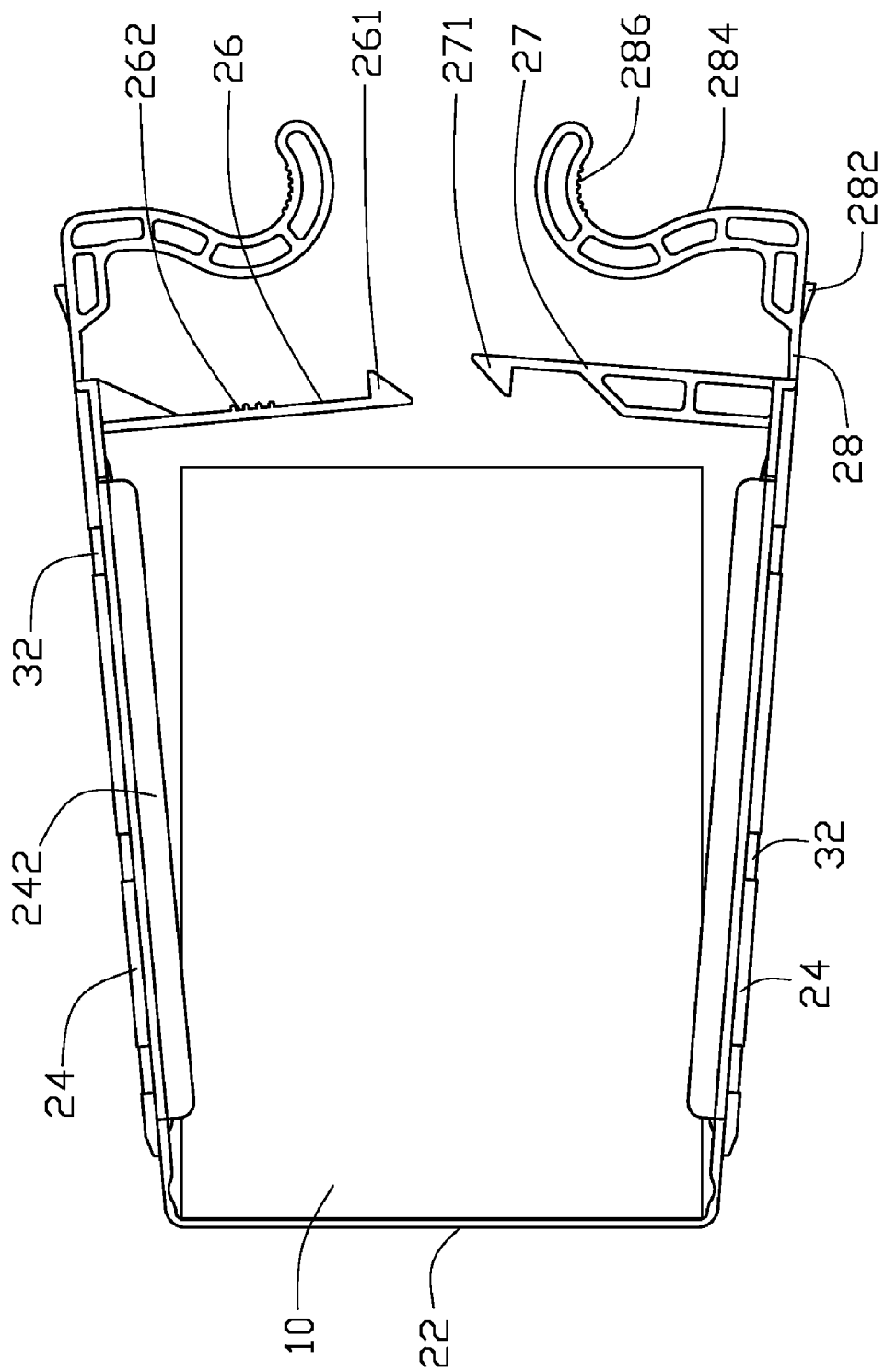
FIG. 3 is a top plan view of the fixing apparatus of FIG. 1 in a releasing position.

Referring to FIG. 3, the fixing pins 40 are made of metal. The fixing pins 40 are inserted into the central through holes 322 of the shock absorbing members 30. The shock absorbing members 30 are retained in the recessed portion 245 of the side plates 24, with mounting portions 32 extending through the mounting holes 246 of the side plates 24.

To retain the HDD 10 in the bracket 20, the latch 26 of the bracket 20 is pushed inward at the toothed urging portion 262 thereof to disengage the hook 261 from the hook 271 of the latch 27 or the latch 27 is pulled outward to disengage the hook 271 from the hook 261 of the latch 26. Then, the side plates 24 are resiliently urged open, for allowing the HDD 10 to be placed therebetween, with the holes 12 of the HDD 10 in alignment with the fixing pins 40 of the side plates 24. Then the side plates 24 are released so that the fixing pins 40 thereof extend into the holes 12 of the HDD 10. The hook 261 of the latch 26 and the hook 271 of the latch 27 engage with each other, and the flanges 242 of the side plates 24 sandwich the HDD 10 therebetween. Thus, the HDD 10 is secured in the bracket 20.

To release the HDD 10 from the bracket 20, the hook 261 of the latch 26 and the hook 271 of the latch 27 are disengaged as described above, so that the side plates 24 of the bracket 20 can be urged open. Thus, the HDD 10 can be easily detached from the bracket 20.

The bracket 20 together with the HDD 10 is inserted into the rack 50, with the platforms 244 of the bracket 20 sliding in the railways 522 of sidewalls 52 of the rack 50. When the wedged blocks 282 of the bracket 20 engage in the locking holes 524 of the sidewalls 52 of the rack 50, the bracket 20 is secured in the rack 50. To release the bracket 20 from the rack 50, the operating arms 284 are drawn toward each other at the toothed urging portions 286 thereof to disengage the wedged blocks 282 from the locking holes 524 of the rack 50. Then, the bracket 20 is slid out of the rack 50.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A fixing apparatus for fixing a hard disk drive (HDD) with a plurality of holes defined in sidewalls thereof, the fixing apparatus comprising:
   a bracket comprising an end plate, and a pair of side plates extending from two ends of the end plates, the side plates capable of being resiliently urged open for allowing the HDD to be placed therebetween and releasably closed to sandwich the HDD therebetween;
   a pair of shock absorbing members respectively attached to insides of the side plates; and
   a plurality of fixing pins attached to the shock absorbing members to engage in the holes of HDD;
   wherein a pair of latches extend from the side plates, respectively, one of the latches forming a first hook at the distal end thereof facing a first direction, the other one of the latches comprises a second hook formed at the distal end thereof facing a second direction opposite to the first direction, to detachably engage with the first hook.

2. The fixing apparatus as claimed in claim 1, wherein each of the side plates comprises a pair of flanges extending from two opposite edges thereof to sandwich the HDD therebetween.

3. The fixing apparatus as claimed in claim 1, wherein each of the side plates comprises a platform extending from an outside thereof, and a recessed portion correspondingly defined in an inside thereof, for receiving the shock absorbing member therein.

4. The fixing apparatus as claimed in claim 3, wherein each of the shock absorbing members comprises a plurality of mounting portions formed therein, each of the platforms comprises a plurality of mounting holes defined therein and extending to the corresponding side plate to receive the mounting portions of the shock absorbing member.

5. The fixing apparatus as claimed in claim 4, wherein a plurality of fixing holes is defined in the shock absorbing members to receive the fixing pins therein.

6. The fixing apparatus as claimed in claim 1, wherein the shock absorbing members are made of conductive rubbers.

7. The fixing apparatus as claimed in claim 1, wherein a pair of locking portions respectively extends forward from free ends of the side plates respectively, a pair of wedged blocks extends from outside walls of the locking portions, respectively.

8. The fixing apparatus as claimed in claim 7, wherein a pair of operating arms extends toward each other from distal ends of the locking portions.

9. The fixing apparatus as claimed in claim 1, further comprising a pair of shock absorbing members respectively attached to the side plates abutting against the HDD.

10. The fixing apparatus as claimed in claim 9, wherein each of the side plates comprises a platform extending from an outside thereof, and a recessed portion correspondingly defined in an inside thereof, for receiving the shock absorbing member therein.

11. The fixing apparatus as claimed in claim 10, wherein each of the shock absorbing members comprises a plurality of mounting portions formed therein, each of the platforms comprises a plurality of mounting holes defined therein and extending to the corresponding side plate to receive the mounting portions of the shock absorbing member.

12. The fixing apparatus as claimed in claim 9, wherein the shock absorbing members are made of conductive rubber.

13. A fixing apparatus for fixing a hard disk drive (HDD) with a plurality of holes defined in opposite sidewalls thereof, the fixing apparatus comprising:
   a bracket comprising an end plate, a pair of side plates extending from opposite ends of the end plates, and a pair of latches respectively formed on the side plates, wherein each of the side plates is movable from a first position substantially perpendicular to the end plate, to a second position away from the other side plate and slanting to the end plate, the moving of the side plates is prevented when the latches releasably engage with each other;
   a plurality of fixing pins extending from the side plates and engaging in the holes of HDD when the side plates are in the first positions.

14. The fixing apparatus as claimed in claim 13, wherein the latches are adjacent to ends of the side plates opposite to the end plate.

15. The fixing apparatus as claimed in claim 13, wherein the latches extend toward each other, one of the latches comprises a first hook formed at the distal end thereof facing a first direction, the other one of the latches comprises a second hook formed at the distal end thereof facing a second direction opposite to the first direction, the first hook and the second hook detachably engage with each other.

16. The fixing apparatus as claimed in claim 13, wherein the bracket is integrally formed, and the side plates are biased towards the first position.

17. The fixing apparatus as claimed in claim 13, wherein a pair of locking portions extends forward from free ends of the side plates respectively, a pair of wedged blocks extends from outside walls of the locking portions, respectively.

18. The fixing apparatus as claimed in claim 17, wherein a pair of operating arms extends toward each other from distal ends of the locking portions.

* * * * *